United States Patent
Cardenas et al.

[11] Patent Number: 5,205,309
[45] Date of Patent: Apr. 27, 1993

[54] ADJUSTABLE PRESSURE CONTROL DEVICE FOR HYDRAULIC BRAKE SYSTEMS

[76] Inventors: Richard A. Cardenas, 12610 Jupiter Rd., Dallas, Tex. 75238; Mark C. Lipski, 6900 Skillman #104, Dallas, Tex. 75231

[21] Appl. No.: 970,770

[22] Filed: Nov. 3, 1992

Related U.S. Application Data

[62] Division of Ser. No. 521,849, May 7, 1990, Pat. No. 5,161,864.

[51] Int. Cl.⁵ .................................................. F16L 55/04
[52] U.S. Cl. .............................................. 137/1; 138/30; 141/4; 303/87
[58] Field of Search ................. 29/890.06; 137/1; 138/30; 141/4; 303/87

[56] References Cited

U.S. PATENT DOCUMENTS

| | | | |
|---|---|---|---|
| 2,563,257 | 8/1951 | Loukonen | 138/30 |
| 2,682,893 | 7/1954 | Ziebold | 138/30 |
| 4,163,461 | 8/1979 | Jacobellis | 138/30 |
| 5,074,625 | 12/1991 | Jones | 138/30 X |

*Primary Examiner*—Gerald A. Michaelsky
*Attorney, Agent, or Firm*—Thomas S. Baker, Jr.

[57] ABSTRACT

An adjustable pressure control device for hydraulic brake system which reduces pressure surges during braking to decrease wheel slip at one or more wheels during braking. The device has replaceable internal elements which may be combined to tailor the damping response of the device to a specified application.

3 Claims, 2 Drawing Sheets

ADJUSTABLE PRESSURE CONTROL DEVICE FOR HYDRAULIC BRAKE SYSTEMS

BACKGROUND OF THE INVENTION

This application is a division of patent application Ser. No. 07/521,849 filed May 7, 1990, now U.S. Pat. No. 5,161,864.

Conventional hydraulic automotive brake systems utilize a source of hydraulic pressure to actuate a piston to bias a brake shoe having a friction material surface into contact with a brake drum in a drum brake system or to bias a piston to move a brake pad containing friction material into contact with a vertical face of a rotor in a disk brake system. Because of the out-of-roundness inherent in brake drums and of the lateral run out inherent in rotors, the friction element alternately engages low and high spots on the brake drum or rotor. Because of the relative incompressibility of the brake fluid the pressure in the brake system experiences a sharp increase when the friction element engages a high spot on the drum or rotor and experiences a relative pressure decrease when the friction element rubs a low spot on a drum or rotor. These pressure fluctuations which occur in the brake fluid cause pressure waves, surges, spikes and harmonics to propagate through the hydraulic system.

Typically, a pressure wave would move from a wheel cylinder or disk brake piston to the brake master cylinder and thereafter be reflected back from the master cylinder to the wheel cylinder or brake caliper piston. Very high momentary braking pressures occur within the hydraulic system when the reflected pressure waves, surges, spikes and harmonics moving toward the brake cylinder or piston add to clamping force already exerted thereon.

In common hydraulic automotive brake systems one or more wheels of the vehicle may lock or skid during severe braking applications while the other wheels are rotating which may cause the vehicle operator to experience a loss of control. It may be demonstrated that wheel lockup occurs because a friction element becomes "stuck" on a so called high spot on a disk brake drum or rotor. This wheel lockup occurs because the high spot initiates a high pressure wave into the hydraulic system which moves from a wheel cylinder or brake piston towards the master cylinder and reflects back through the brake line and adds to the clamping force already exerted on the shoe or caliper. Consequently, it has been found that the addition of a small accumulator to the hydraulic system will absorb pressure surges to maintain a constant fluid pressure at each actuator piston and thereby reduce the tendency of a friction element to prematurely become "stuck" on a brake drum or rotor high spot.

One type of accumulator which has been added to an automobile brake system to reduce pressure or surges may be seen by referring to U.S. Pat. No. 3,430,660 to Mitton. The Mitton device utilizes a hollow resilient bulb contained within a housing having concave side walls. A space exists between the outside surface of the bulb and the inner wall of the housing. Additionally, a central cavity within the bulb is in fluid communication with the vehicle hydraulic fluid. Consequently, when pressure peaks or surges are encountered within the system the side walls of the bulb expand outwardly to absorb the pressure surges or transients and maintain a constant hydraulic pressure at all vehicle wheels.

In U.S. Pat. No. 4,571,009 to Jones, the inventor claims an advantage in having the space between the outer walls of the resilient bulb and the inner walls of the housing pre-pressurized with air. This pre-pressurization occurs by making a substantial length of the bulb with a larger diameter than the opening of the housing into which the bulb is inserted. Consequently, after the bulb has been inserted into the housing the air in the space between the bulb and the housing is pressurized.

Although, the accumulators described in the aforementioned patents function to reduce pressure surges within a vehicle brake system, they suffer a number of disadvantages. To begin with, the devices are not universally applicable to all vehicle hydraulic systems. As an example, the hydraulic brake system for a motorcycle contains a small volume of fluid compared to the volume of brake fluid in an automobile or truck or bus hydraulic system. Thus, a different accumulator must be manufactured for each of these systems. Additionally, the accumulators do not discriminate between vehicles which are heavy or light in weight, vehicles which carry a large percentage of their weight on the front of the vehicle as opposed to the rear of the vehicle and high performance vehicles such as racing cars which have different braking requirements than conventional passenger cars. Accumulators must be custom made for each application. Also, in the past it has been difficult to obtain an accumulator which will provide the optimum amount of brake pedal pressure or the optimum amount of brake travel required during the braking process. Additionally, prior accumulators have been unable to provide a desired feel of the brake pedal or feedback from the brake pedal to the operator during the brake process in vehicle brake system with accumulator. In some vehicle applications the brake pedal may feel spongy whereas in other vehicle applications the brake pedal may feel very stiff to an operator after an accumulator has been installed. Also, in some vehicle applications a relatively large amount of brake pedal travel occurs whereas in other applications very little brake travel occurs as a result of the addition of an accumulator within the vehicle hydraulic system. Furthermore, neither of the aforementioned prior art accumulator devices provides a simple means of adjusting the device to obtain a desired or proper brake pedal feel or amount of travel.

It has been found that where an accumulator device of the type described in the aforementioned Mitton patent has been added to a vehicle hydraulic brake system the accumulator device must be initialized prior to obtaining proper operation thereof. Such an initialization requires that a vehicle operator make several severe braking applications or panic stops subsequent to installation of the device. This initialization must occur each time the integrity of the hydraulic system is disturbed.

As mentioned previously, the accumulator device described in the aforementioned Jones patent pre-pressurizes the space surrounding the resilient bulb within the housing by trapping a volume of air within that space during installation of the resilient element within the housing. It has been found that as the under hood temperature of a vehicle changes the feel of a brake pedal during the braking process also changes in vehicles equipped with the Jones type of accumulator. It has been discovered that such a change results from the fact that the trapped air within the space between the resilient bulb and the metal housing changes pressure with temperature because of impurities including moisture within the air. This moisture may also cause a degradation of the accumulator device and other brake system components.

From the above, it may be seen to be desirable to provide a pressure control device for a vehicle hydraulic brake system which may be adjusted readily to provide an optimum brake pedal feel and travel amount for any desired vehicle, which does not require an initialization process subsequent to installation which may be utilized in vehicles having large or small volume hydraulic systems, which will accommodate light or heavy vehicles or vehicles which have a greater percentage of vehicle weight on one end of the vehicle or the other, which will work satisfactorily on high performance vehicles and which maintains a more constant brake pedal feel and amount of travel without regard to vehicle under hood temperature.

SUMMARY OF THE INVENTION

The subject invention provides an adjustable, pressure control device for a vehicle hydraulic brake system with a housing having a brake fluid port and a cavity for receiving a diaphragm. A resilient shaped diaphragm mounts within the cavity and a fluid passage in the housing connects the fluid port to the cavity to enable brake fluid to pass to one side of the diaphragm. A cap having a control chamber formed therein is affixed to the body such that it overlies the opposite side of the diaphragm. A removable variable shaped volume control element is mounted within the control chamber in contact with the opposite side of the diaphragm. The control element cooperates with the resilient diaphragm to control the volume of the diaphragm which enters into the control chamber and the rate at which the diaphragm collapses into the control chamber around the control element.

DESCRIPTION OF THE DRAWINGS

FIGS. 3A through 23D represent different configurations and constructions of the diaphragm elements which may be utilized within the pressure control device of the subject invention;

FIG. 5 represents a cross-sectional view of an adjustable pressure control device of the present invention mounted within a base tool device for gas pressurization of the control chamber.

DESCRIPTION OF THE PREFERRED EMBODIMENT

Figure 1:
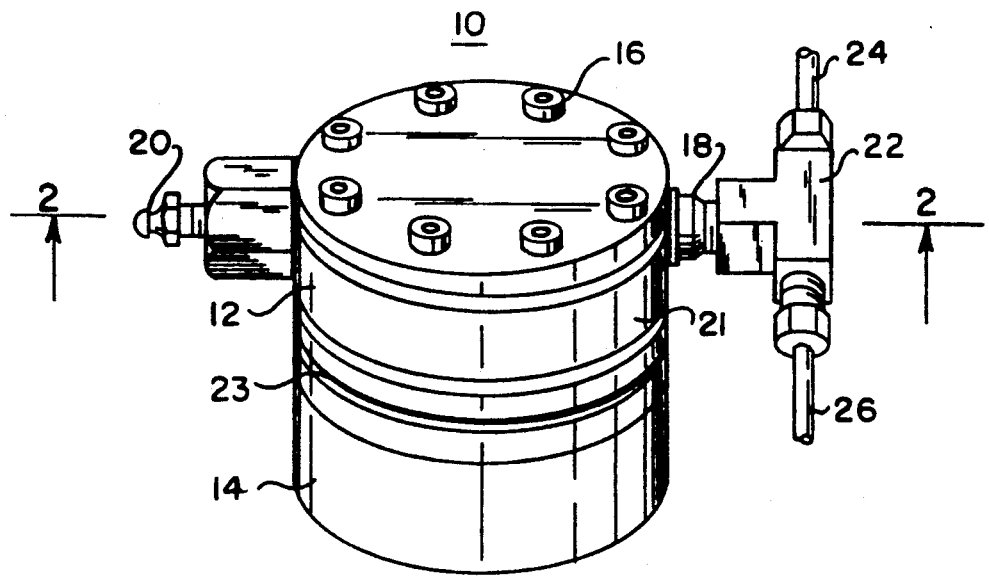
FIG. 1 is a perspective view of the pressure control device of the subject invention mounted within a vehicle brake line.

Turning to FIG. 1, the adjustable pressure control device (10) of the present invention may be seen to comprise a generally cylindrical shaped housing (12) affixed to a cap element (14) by a plurality of bolts (16). A threaded coupling (18) and a bleeder screw (20) project laterally from the outer surface (21) of housing (12). A plurality of cooling grooves (23) are formed within outer surface (21). The threaded coupling (18) connects the pressure control device (10) to a conventional T fitting (22) the opposite ends of which are connected in fluid communication with hydraulic lines (24 and 26) in a well known manner. In this figure, T fitting (23) and hydraulic lines (24 and 26) illustrate the connection of the adjustable pressure control device (10) of the present invention to a hydraulic conduit leading from a vehicle brake master cylinder output line to two of the wheel cylinders in a dual chamber type master cylinder hydraulic system or to four wheel cylinders in a single chamber master cylinder hydraulic system. Of course, where a master cylinder has two separate output lines to separate pairs of brake actuator cylinders, a separate adjustable pressure control device (10) must be inserted in each of the master cylinder output lines. The device also may be inserted in the hydraulic system adjacent each wheel cylinder or caliper. In some high performance systems it may be desirable to have a pressure control device adjacent each caliper or brake cylinder.

Figure 2:
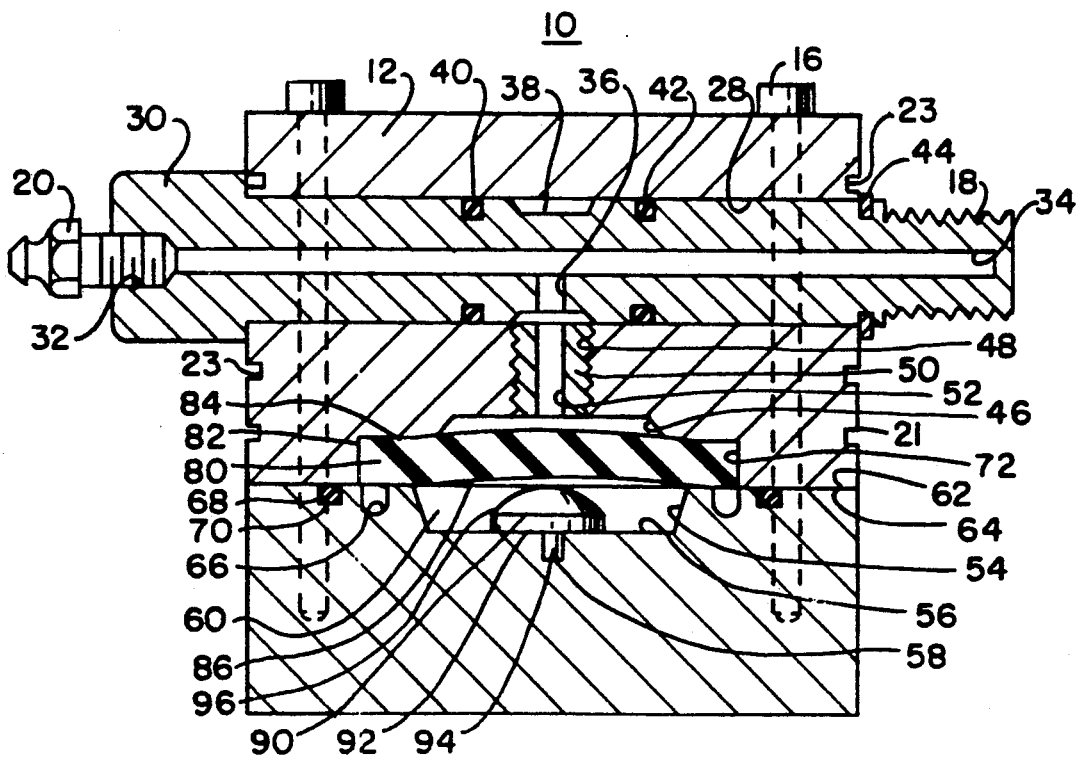
FIG. 2 is a vertical sectional view along line 2—2 of FIG. 1.

Details of the adjustable pressure control device (10) of the present invention may be seen by referring to FIG. 2 which provides a cross sectional view of the device. Housing (12) has a lateral bore (28) which receives a single piece adapter (30). One end of adapter (30) has the external threads (18) which engage T fitting (22) as mentioned above and the opposite end of adapter (30) has a threaded internal bore (32) which receives bleeder screw (20). A central bore (34) extends longitudinally through adapter (30). A lateral bore (36) in adapter (30) intersects central bore (34) and opens into a central reduced diameter portion (38) of the adapter (30). O rings (40 and 42) are placed on the outer surface of adapter (30) on opposite sides of the reduced diameter portion (38) to prevent hydraulic fluid from leaking out of bore (28). It may be observed that a spring clip (44) prevents adapter (30) from withdrawing from lateral bore (28). The adapter (30) may have an anti rotation clip, not shown, which could be bent into a cooling groove (23) formed in the outer surface (21) of housing (12) to prevent rotation of the housing (12) around the outer surface of adapter (30). It should be apparent that the enlarged end of adapter (30) containing bleed screw (20) engages the outer surface (21) of housing (12) and limits the movement of adapter (30) into bore (28).

Housing (12) further includes a stepped longitudinal bore (46) which opens into lateral bore (28). Stepped bore (46) includes a threaded portion (48) which receives a replaceable shaped flow control orifice (50) having a bore (52). The size and shape of bore (52) may be changed to control the flow of fluid therethrough.

Referring again to FIG. 2 it may be observed that cap (14) includes a bore (54) which cooperates with a bottom wall (56) having a shallow central counter bore (58) to define an upwardly facing control chamber or space (60) which opens into the stepped bore (46) of housing (12). The surface (62) of cap (14) which mates with the surface (64) of housing (12) also includes a seal groove (66) and an O ring groove (68) containing an O ring (70). It should be noted that the maximum diameter portion (72) of bore (46) overlies cap surface (62) in the area between seal groove (66) and O ring groove (68).

A resilient diaphragm (80) having an outer diameter (82) slightly greater than the inner diameter of maximum diameter portion (72) of stepped bore (46) fits tightly within that portion of the bore. Diaphragm (80) provides a fluid tight barrier between hydraulic brake fluid which may flow through adapter bores (34 and 36) and orifice bore (52) to one side (84) of the diaphragm (80) and control chamber (60) which is sealed by the opposite side (86) of the diaphragm. It should be noted that a portion of diaphragm (80) is squeezed into seal groove (66). In this manner resilient diaphragm (80) provides a fluid tight seal for control chamber (60). O ring (70) functions to provide a secondary seal to prevent seepage of any hydraulic fluid which may leak past the outer diameter (82) of diaphragm (80) in bore portion (72).

A control element (90) having a relatively flat bottom surface (92) which engages the bottom wall (56) of bore (54) and a stem (94) which is received within counter bore (58) occupies control chamber (60). The upwardly facing top surface (96) of control element (90) engages the side (86) of diaphragm (80). Control element (90) functions to control the volume of the diaphragm (80) which enters control chamber (60) and the rate at which the diaphragm collapses into control space (60) as will be described in more detail hereinafter.

Figure 5:
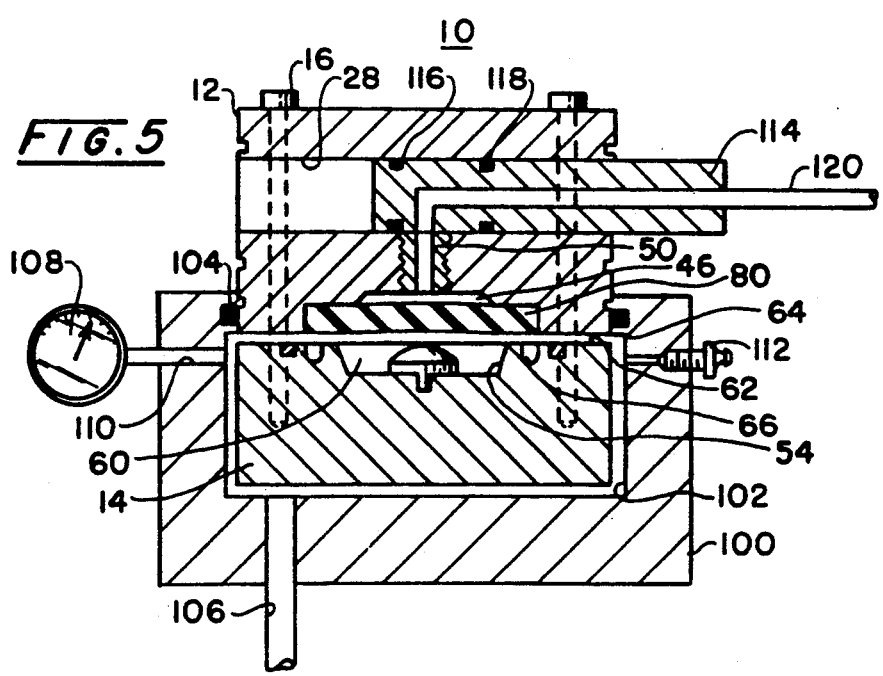

It has been discovered that more consistent brake pedal pressures will be obtained despite changes in ambient temperatures when the control chamber (60) has been pressurized with nitrogen or other inert gases as will be explained hereinbelow. The method of attaining pressurization of space (60) may be seen by referring to FIG. 5. The apparatus utilized to charge the control chamber (60) includes a charging tool (100) having an inside surface (102) with a diameter slightly greater than that of the outside diameter of pressure control device (10). An O ring (104) resides near the outer end of the inside surface (102). Charging tool (100) further includes an inert gas port (106) for receiving a source of an inert gas such as nitrogen, which opens into the bottom of charging tool (100), a pressure gauge (108) mounted in a side wall and connected to a fluid passage (110) which opens into inside surface (102) beneath O ring (104) and a bleeder valve assembly (112) mounted in a side wall which also opens into inside surface (102) below O ring (104). During the charging operation, adapter (30) is removed from lateral bore (28) and a vacuum adapted (114) is substituted therefore. Vacuum adapter (114) includes a pair of O rings (116 and 118) on the outer surface thereof which seal bore (28) on either side of orifice (50). Additionally, the outer end of adapter (114) includes a fitting (120) connected to a vacuum pump not shown.

The method of charging the control spacer chamber (60) is as follows. Pressure control device (10) is inserted within charging tool (100) cap first until the surface (62 and 64) at the interface of the housing (12) and cap (14) lie within the charging tool beneath the O ring (104) formed in side wall surface (102). Thereafter, the bolts (16) which affix cap (14) to housing (12) are loosened, a source of vacuum is connected to fitting (120) and bleeder assembly (112) is opened. Subsequently, a vacuum source is applied to the port (120) to cause the resilient diaphragm (80) to be withdrawn into the stepped bore (46). Although it has been found that in some instances the step of applying a vacuum to the top side of the diaphragm (80) may be eliminated it has been found preferable to include this step in the process inasmuch as it ensures that the inert gas will have a freer path between the mating surfaces (62 and 64) to the control chamber (60).

Next, a source of inert gas such as nitrogen is supplied to port (106). After a sufficient amount of gas has been applied to this port to ensure that any air within the charging tool (100) and within the interface between mating surfaces (62 and 64) and control chamber (60) has been purged, bleeder assembly (112) is closed. Additional gas is supplied to port (106) until sufficient pressure, as indicated by the pressure gauge (108), has entered the control chamber (60). Normally this pressure would be between one and five pounds per square inch. When a satisfactory gas pressure has been attained, bolts (16) are turned to secure cap (14) to housing (12) and to cause diaphragm (80) to be jammed within the seal groove (66) and form a seal on the surface (62) between the seal groove (66) and the bore (54) of control chamber (60). Nitrogen has been selected as a preferred inert gas to pressurize the control chamber (60) inasmuch as pure nitrogen changes pressure less with respect to changes in ambient temperature than air. Thus, pedal pressure will not change as under hood temperature changes. Additionally, the nitrogen atmosphere does not induce corrosion or deterioration of metal, rubber or plastic components.

Operation of the adjustable pressure control device (10) of the present invention now will be described. It may be recalled that the function of the pressure control device (10) within a hydraulic system is to eliminate pressure surges, spikes and harmonics that occur within the system during braking operation which result from brake friction material encountering high spots on a rotor or drum which tend to apply large forces to the brake piston and induce pressure peaks within the hydraulic system as described hereinbefore. Turning again to FIG. 2, the pressure control device of the present invention connects to a vehicle hydraulic system such that hydraulic fluid within that system passes through bores (34 and 36) in adapter (30) and through adjustable orifice bore (52) to one side (84) of a resilient diaphragm (80). Typically, diaphragm (80) would be constructed of some type of elastomeric material having a durometer rating in the range of 40 to 80 durometers. In normal braking situations the stiffness of the diaphragm (80) is such that it does not flex and attempt to move into the control chamber (60). However, when a pressure peak occurs within the system, the high fluid pressure applied to the surface (84) of diaphragm (80) causes the diaphragm to tend to wrap around the upwardly facing top surface (96) of control element (90) and move into control chamber (60). The volume of diaphragm (80) which may move into control space (60) and the rate at which the diaphragm moves into that space is controlled by the interchangeable elements within the pressure control device (10) which make it adjustable and which enable the device to be tailored to almost any desired vehicle application. These adjustments change the rate of damping of the pressure surges within the hydraulic system. The removable and replaceable elements which cooperate to provide adjustability to the pressure control device (10) include the fluid control orifice (50), the resilient diaphragm (80) and the control element (90). Also, the shape of the control chamber (60) may be changed to alter the damping rate of the system.

As an example, the rate at which the resilient diaphragm (80) moves toward the control chamber (60) may be varied by increasing or decreasing the size and shape of the bore (52) in the removable fluid control orifice member (50). Decreasing the size and/or changing the shape of the bore (52) reduces the rate at which diaphragm (80) moves towards the control chamber

(60) whereas increasing the size and/or changing the shape of the orifice increases the rate at which the diaphragm (80) will move towards the control chamber (60).

As may appear obvious, some vehicles such as motorcycles have relatively small fluid capacity hydraulic brake systems when compared with systems in an automobile or a large vehicle such as a truck. Accordingly, in such vehicles only a small volume of the resilient diaphragm (80) must be allowed to move into the control chamber (60) inasmuch as this volume must be made up by whatever fluid would be available in a reservoir for the hydraulic system. In order to limit the volume of the diaphragm (80) which will move into the control chamber (60), a relatively large control element (90) would be inserted within the chamber (60). Obviously, as the size of the control element (60) increases the volume of the control chamber (60) available to receive a portion of the diaphragm (80) decreases.

Figure 4A:
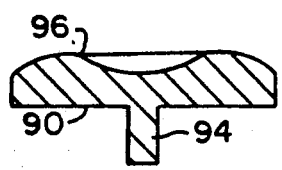
FIGS. 4A thorough 4C represent different configurations of control elements which may be mounted within the adjustable pressure control device of the subject invention.
Figure 4B:
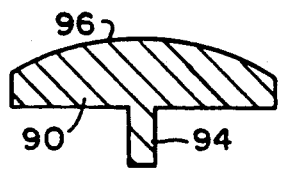
Figure 4C:
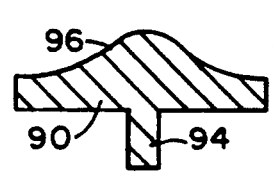

In addition to altering the size of the control element (90) to accommodate hydraulic brake systems having different capacities, it has been found that the shape of the upwardly facing outer surface (96) of the control element may be changed to adjust the damping rate of the pressure peaks within the system to accommodate lighter or heavier vehicles or vehicles which are heavily loaded at one end. Turning to FIGS. 4A through 4C, three control elements (90) having different upwardly facing outer surfaces (96) which engage one side (86) of diaphragm (80) are shown. The control element (4B) exhibits a convex outer surface which tends to reduce the rate at which the resilient diaphragm (80) moves into the control chamber (60) inasmuch as a greater amount of outer surface (96) engages the side (86) of diaphragm (80) and tends to resist the rate at which the diaphragm moves into the control space (60). As a result, the control element (90) illustrated in FIG. 4B tends to decrease the damping rate of the hydraulic fluid. In contrast thereto, the control element (90) illustrated in FIG. 4C having a generally conical shape provides less upwardly facing surface (96) to contract the face (86) of diaphragm (80). Consequently, the diaphragm (80) tends to flow around that outer surface (96) at a relatively high rate thereby increasing the damping rate of the hydraulic fluid during the braking operation. Lastly, the control element (90) having a concave upwardly facing outer surface (96) illustrated in FIG. 4A provides a system having a reduced rate of response initially as the braking operation commences and thereafter an increased rate of response as the pressure applied to the brake pedal increases. This occurs because initially the high circular rim surrounding the dished concave portion of the surface tends to resist movement of the diaphragm (80) into the control space and thereafter causes the rate of movement to increase.

Figure 3A:
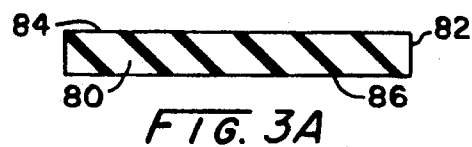
Figure 3B:
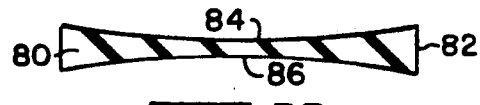
Figure 3C:
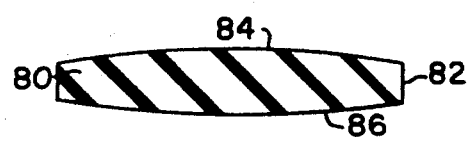
Figure 3D:

It has been found that in addition to changing the shape and size of the control element (90) to control the volume of diaphragm (80) and the rate of movement of diaphragm (80) into the control chamber (60) these factors also may be influenced by changing the shape of the outer surface of the resilient diaphragm (80). These factors also may be influenced by changing the material comprising the diaphragm (80). As an example, the diaphragm (80) may be constructed as a single piece of rubber or it may be constructed of rubber covering fiber or fabric layers to achieve a desired stiffness. It also may be constructed of rubber having different hardnesses such as but not limited to an EPDM type rubber having durometer readings ranging from 40 through 80. Turning to FIGS. 3A through 3D, several different types of diaphragms (80) may be observed. FIG. 3D illustrates the cross sectional area of a diaphragm (80) having alternate rubber and fabric or fiber layers. In most applications, a diaphragm (80) having parallel surfaces (84 and 86) as illustrated in FIG. 3A would be utilized to provide a preset damping rate for the system during the braking operation. However, in some vehicle applications such as lighter weight cars where lower braking forces are encountered during braking, a system having a high damping rate may be preferred. Such a response also may be desirable when certain friction materials are utilized such as those which are relatively soft. For these applications the diaphragm may have concave surfaces (84 and 86) as illustrated in FIG. 3B. Of course, the degree to which the surfaces are made concave and whether or not one or both of the surfaces (84 and 86) are made concave also function to determine the rate of damping of the hydraulic system during the braking operation. A softer diaphragm material also will result in a higher damping rate. Lastly, damping rate may be decreased by the use of a diaphragm (80) having one or both outer surfaces (84 and 86) made convex as illustrated in FIG. 3C. The convex outer surfaces (84 and 86) reduce the flexibility of the diaphragm (80). Consequently, a higher brake pedal pressure would be required to cause the diaphragm to move into the control chamber (60). A hard diaphragm material also will reduce the flexibility of the diaphragm (80).

From the above, it may be seen that a basic adjustable pressure control device (10) of the present invention may be custom made to accommodate a wide range of vehicle brake systems and to precisely tailor the damping rate of the system simply by changing three replaceable components of the device. Changing the adjustable orifice (50) changes the rate of response of the system as mentioned above and changing the diaphragm (80) and/or the control element (60) enables the device to accommodate a very wide range of vehicle hydraulic brake systems as used in a wide range of vehicles having different weights, sizes, braking performance demands, fluid line pressures, etc.

Since certain changes may be made to the above-described structure and method without departing from the scope of the invention herein it is intended that all matter contained in the described thereof or shown in the accompanying drawing shall be interpreted as illustrative and not in a limiting sense.

We claim:

1. A method of adding an inert gas to a control chamber of an adjustable pressure control device for a hydraulic brake system having a housing with a brake fluid port and a cavity for receiving a diaphragm, a resilient diaphragm mounted in said cavity, fluid passage means in said housing for connecting said fluid port to said cavity to enable brake fluid to pass to one side of said diaphragm, a cap adapted to be affixed to said body by a plurality of fasteners such that it overlies the opposite side of said diaphragm, a control chamber formed in said cap which opens to the opposite side of said diaphragm and adapted to receive a control element, a removable control element mounted in said chamber and in contact with said opposite side of said diaphragm wherein said control element cooperates with said resilient diaphragm to control the volume of the diaphragm which enters into said control chamber and the rate at which the diaphragm collapses into said control chamber around said control element and seal means at the interface of said housing and said cap to seal said control chamber comprising the steps of;

loosening said fasteners such that a narrow opening exists between said housing and said cap;

mounting said cap and a portion of said housing in a bore formed in a base tool having an inert gas port and a bleed port such that said housing sealingly engages the wall of said base tool bore and the interface of said housing and said cap is beneath said bore seal;

opening said bleed port in said base tool;

providing a source of inert gas to said inert gas port to enable inert gas to flow into the opening at the interface of said housing and said cap to thereby fill said control chamber with inert gas;

closing said bleed port after said control chamber has been filled with inert gas and said gas flows from said bleed port;

tightening said fasteners to secure said cap to said housing such that said control chamber is sealed;

2. The method of claim 1 comprising the further steps of:

providing a source of vacuum to said brake fluid port in said housing prior to providing said inert gas source; and removing said source of vacuum to said brake fluid port after the fasteners have been tightened.

3. The method of claim 1 in which said inert gas is nitrogen.

* * * * *